Feb. 22, 1927.

J. T. DICKSON 1,618,644

CENTRIFUGAL CLUTCH

Filed April 19, 1926

INVENTOR:
J. T. Dickson,
BY
J W Sheely
ATTORNEY.

Patented Feb. 22, 1927.

1,618,644

UNITED STATES PATENT OFFICE.

JAMES T. DICKSON, OF LOS ANGELES, CALIFORNIA.

CENTRIFUGAL CLUTCH.

Application filed April 19, 1926. Serial No. 102,924.

The present invention relates to centrifugal clutches and actuating devices for same, and has for its principal object the provision of a simple and efficient centrifugal clutch suitable for quick starting prime movers of low starting torque, such as electric motors, for instance.

Another object of the invention is to provide a clutch which will "throw in" automatically without sudden strain on inert parts.

Another object of the invention is to provide for using the displacing force, or head, of a rapidly revolving body of fluid, such as water or oil, to throw the clutch.

Another object of the invention is to provide a centrifugal clutch between a driving and a driven member, which will throw in automatically after the driving shaft has attained a predetermined speed. Certain prime movers attain full speed very quickly, and at such speed they have a high reserve of power, so that if the driving member is connected with a driven member too suddenly, the driven member will be subject to excessive strain. It is therefore another object of the invention to provide an automatic clutch which will not only delay action until the driving member has attained full speed, but which will act to slowly pick up the load of the driven member, so that the driven member may be gradually but steadily accelerated to full speed.

Another object of the invention is to provide for throwing out the clutch without the usual levers, toggles, cams and other intricate arrangements of parts common to mechanisms of this class.

Another object of the invention is to provide a clutch of the above described type, which may be thrown out readily while the prime mover is running at full speed.

Still another object of the invention is to provide a clutch, which may be so controlled that the driving parts may rotate freely, without effort on the part of the driver, at any speed and for any length of time until the operator desires to have the load of the driven member picked up.

Still other objects and advantages will appear hereinafter.

I have illustrated by the accompanying drawings a preferred embodiment of my invention and a modification thereof.

In the said drawings.

Figure 1:
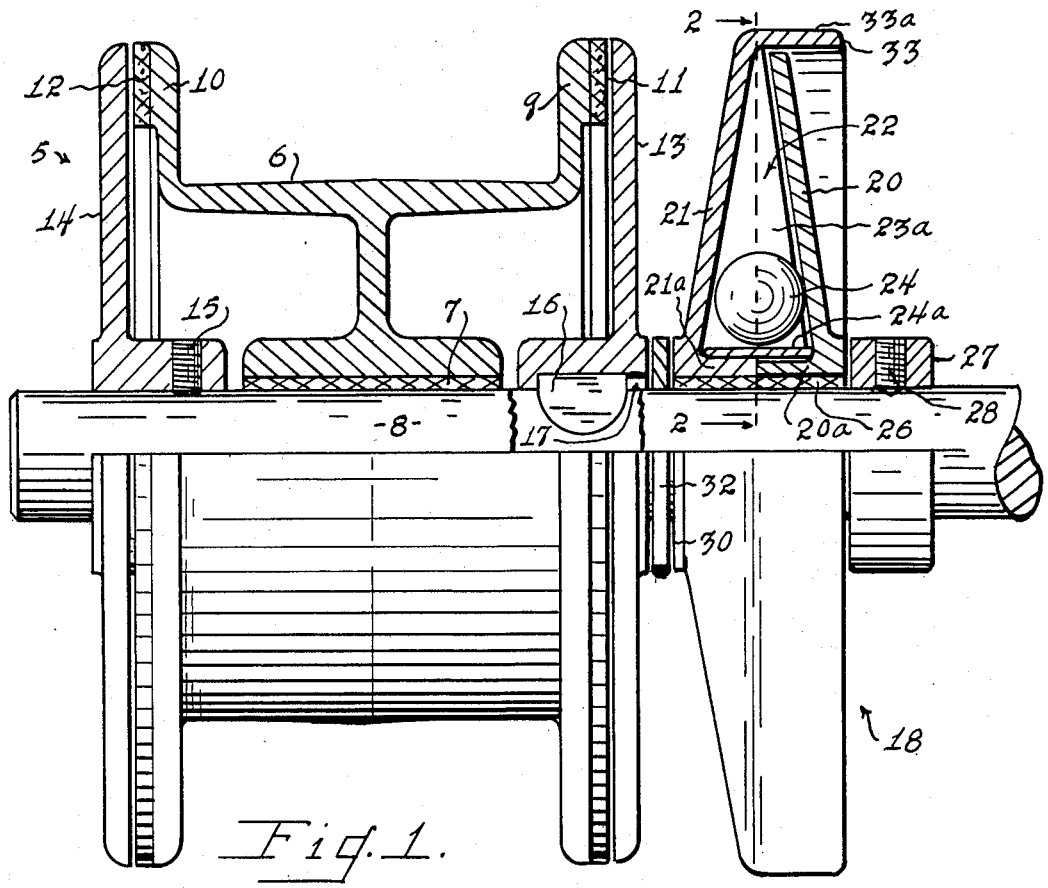
Figure 1 is a view partially in vertical section and partially in elevation of the preferred embodiment.

In carrying out my invention in its application to clutches, I provide a completely revoluble clutch throwing mechanism which operates to throw in the clutch when said mechanism itself has attained a given rate of revolution. Said clutch throwing mechanism is only frictionally and slightly connected with the clutch proper so that when that part of the clutch which is first to revolve, gets under way, the clutch actuating mechanism attains speed more slowly and does not operate until a period of time after the revolving part of the clutch has attained full speed. Further provision is made to prevent sudden pick up of the load on the part of the driving apparatus or prime mover. Such provision, for example, is that of providing for the clutch throwing mechanism to increase its thrust upon the clutch as its own speed increases, whereby the said mechanism throws the clutch in lightly, and gradually sets the clutch toward maximum torque as the load is taken up.

To illustrate my invention, although it is conceived that numerous different embodiments may be employed, I have shown a clutch 5, including a pulley 6 having a friction reducing bearing 7, whereby it is independently revoluble on a shaft 8, on which it is loosely mounted. Said pulley is provided with spaced flanges 9 and 10 respectively, presenting opposed friction surfaces 11 and 12. The shaft carries clutch discs 13 and 14 respectively. Disc 14 is keyed and fixed immovably to the shaft, as at 15, while disc 13 is splined to the shaft, but is movable axially thereof. It will be apparent now that when the shaft is rotated the pulley may readily remain stationary, particularly if it has a load. Both discs will turn with the shaft. To cause the shaft to drive the pulley, the disk 13 is moved toward the corresponding flange of the pulley until it abuts same. Continued movement of the disc 13 moves the pulley along the shaft until its other flange is in frictional contact with the corresponding disc 14. When the parts have so moved, the clutch is in.

For operating the clutch automatically and for throwing it in gradually, so that the load of the pulley is gradually picked up, I provide the centrifugal clutch operating mechanism 18. In employing the term "centrifugal clutch operating mechanism", I mean any device which operates to throw a clutch when said device, or any part thereof, has acquired revolving motion of a predetermined, or other degree.

Figure 2:
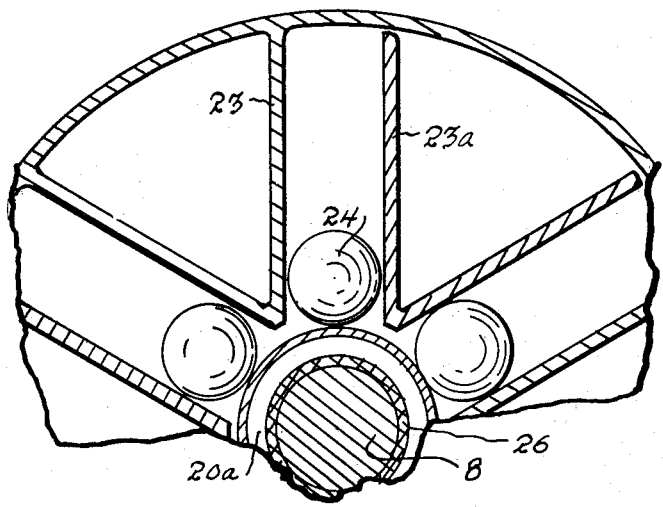
Figure 2 is a view in section on a line 2—2 of Fig. 1.

Said mechanism, in the embodiment of the invention shown in Figs. 1 and 2, is composed of a pair of relatively movable plates 20 and 21, respectively, providing an interior annular space 22, which decreases in width outwardly. Said space is divided into several radially directed individual spaces by ribs 23 and 23ª, respectively, carried by said plates. Within each space there is disposed a loose outwardly movable weight 24, adapted on outward movement by centrifugal force, to drive the plates apart. Said weights, which are shown in the form of spheres of balls, normally seat on a retaining ring 24ª. Each plate has an integral sleeve encompassing the shaft at a spaced distance, and each sleeve is provided internally with a bearing 26, loose on the shaft. Thus the centrifugal mechanism is loosely mounted on the shaft. The said mechanism is held loosely on the shaft by a collar 27, fixed to the shaft by set screw 28. The mechanism presents a friction surface 30 to the adjacent clutch disc. The clutch disc and the surface 30 are spaced apart by a loose washer 32 or the like. The washer may have any desired coefficient of friction, or it may be practically frictionless, according to conditions, as will be apparent hereinafter. The collar is set so that it will not crowd the centrifugal mechanism against the adjacent friction disc, when the clutch is out. One of the plates, such as 20, is provided with an annular flange 33 extended horizontally to provide an outer surface 33ª, on which the human hand or any object may be applied to retard revolution of said plates. Since some of the ribs are carried by one plate and other ribs are carried by the other plate, both plates will rotate together.

In describing the operation of the embodiment shown in Figs. 1 and 2, it will be assumed that the shaft is directly connected with an electric motor or other prime mover, (not shown) which it is desired to have pick up the load of the pulley gradually, through the medium of the clutch. The prime mover is started and rapidly acquires full speed, as does the shaft. The pulley remains motionless because there is no appreciable connection between it and the shaft. The weight of the centrifugal mechanism on the shaft causes it to gradually attain speed, due to its slight frictional connection with the shaft and the fact that it has little resistance. The mechanism, however, will always "lag" or be rather slow to attain speed and will probably never attain the speed of the shaft unless it becomes frictionally connected with it. As it attains speed, the balls move outwardly, thrusting the plates apart until one plate is in contact with the washer and the other plate is in contact with the collar. Continued spreading of the plates will throw the clutch in. The effective thrust of the centrifugal mechanism depends upon its speed. Obviously the clutch discs will not even be moved to "in" position until some lapse of time after starting of the prime mover. When the mechanism causes the clutch discs to first engage the pulley, there will be increased frictional connection between the mechanism and the shaft, due to the friction, however slight, between plate 21, the washer, and the adjacent clutch disc. The more the mechanism thrusts against the clutch, the more nearly its speed will approximate that of the shaft. Gradually, but practically never at a too rapid rate, will the centrifugal mechanism attain a speed equal to that of the shaft; the weight of the plates and balls giving the inertia to the mechanism. When full speed of the mechanism is attained it will hold the clutch in with the maximum thrust, and the prime mover will drive the pulley positively with little or no slip.

Having started the pulley gradually and automatically so that the prime mover is given the load slowly, something occurs to suddenly overload the prime mover so that it slows down. Such reduction of speed will render the centrifugal mechanism less effective and the clutch will slip until the motor is again capable of carrying the load. If at any time it is desired to stop the pulley while the motor is running, it is only necessary to retard the mechanism by some external agent. This may be done by pressing the palm of the hand, or a brake (not shown), against the surface 33ª of the plate 21. Even when the mechanism is exerting maximum thrust against the clutch, the resistance required to retard or stop the mechanism is slight, because of the comparatively slight frictional connection between the parts of the mechanism and the shaft, or the members keyed thereto. Immediately the mechanism is so retarded the centrifugal force of the weights is reduced. The weights are of course arranged so as not to wedge permanently in position, whereby they fall or are crowded by the resiliency of the clutch parts, back to operative position or toward the center of the shaft. Thus, while the shaft is running at full speed, the clutch may be thrown out merely by pressing the palm of the hand on the revolving centrifugal mechanism.

To throw the clutch in again gradually, but without conscious effort on the part of the attendant, the centrifugal mechanism is released and allowed to again gradually pick up speed and gradually feed the clutch in.

It will be apparent now that my invention provides for causing a motor or the like to automatically and quite gradually pick up its load and to automatically relieve itself of such load if it becomes excessive. Usual centrifugal clutches are sudden in their action inasmuch as the centrifugal mechanism of same is invariably caused to revolve at the same rate as the clutch parts, and the said mechanism cannot be disengaged or retarded without necessity for breaking the friction hold of the clutch parts.

Figure 3:
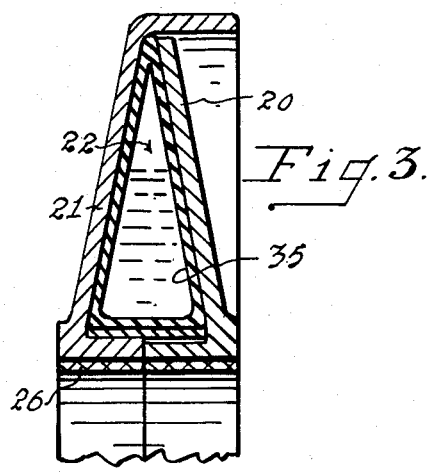
Figure 3 is a fragmentary section of the modification.

In the form of the invention shown in Fig. 3, the space between the plates is occupied by a sealed bag 35, containing a suitable fluid. The fluid exerts a lateral thrust to move the plates apart when said fluid is revolving rapidly, but the fluid causes a further lag, which is advantageous, inasmuch as it always lags behind the bag which contains it, there being only ordinary cohesion between the fluid and the walls of the bag.

While I have shown and described a specific embodiment of my invention, I do not limit myself to any specific construction, embodiments, or arrangement of parts, and may alter same as I desire, or use any construction or arrangement of parts coming within the scope of the appended claims.

I claim:—

1. In a device of the class described, the combination of a driving member, a driven member adjacent to said driving member; the members relatively movable to bring the driving member into engagement with the driven member, and a centrifugal mechanism frictionally connected with the driving member so as to lag with regard thereto; said mechanism acting to cause such relative movement.

2. In a device of the class described, the combination of a driving member, a driven member adjacent to said driving member; the members relatively movable to bring the driving member into engagement with the driven member, and a centrifugal mechanism driven by the driving member; said mechanism adapted to cause such relative movement, and means whereby the centrifugal mechanism is caused to lag with regard to said driving member.

3. In a device of the class described, the combination of a revoluble clutch member, a centrifugal clutch mechanism for operating said clutch member when the mechanism has attained a given rate of revolution, and means whereby said mechanism can attain such predetermined speed only an appreciable interval after the clutch member has attained such speed.

4. In combination, a revolving member, a centrifugal mechanism, and means non-positively connecting said member and mechanism whereby the mechanism is retardatively driven by said member.

5. In a centrifugal clutch operating mechanism, a shaft, a pair of axially movable spaced walls providing an intermediate space; at least one of said walls being loosely and revolubly mounted on said shaft, loose means within said space adapted to revolve around said shaft, and means whereby revolution of said means will cause an axial thrust to move said loose wall axially of the shaft.

6. In a centrifugal operating mechanism, a shaft, a pair of spaced walls providing an intermediate space decreasing in width outwardly, and loose weights in said space; said walls loosely encompassing said shaft, whereby delayed acceleration of said walls by revolution of said shaft will cause said weights to move said walls axially of the shaft.

JAMES T. DICKSON.